Aug. 1, 1961     H. S. GABLE ET AL     2,994,361
METHOD AND APPARATUS FOR SEALING THERMOPLASTIC MATERIAL
Filed June 18, 1958     2 Sheets-Sheet 2
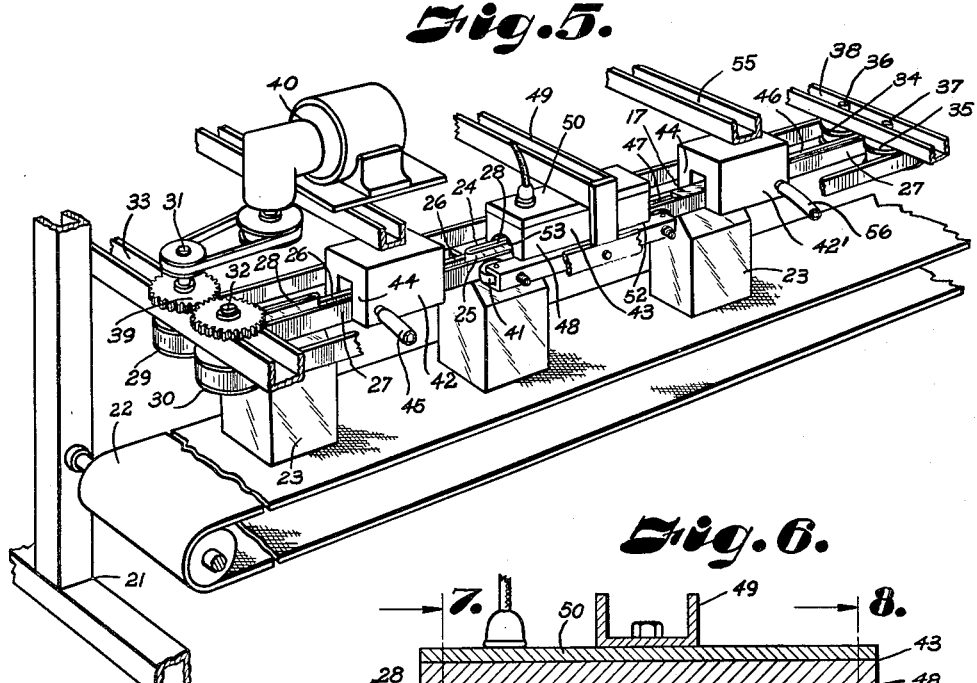
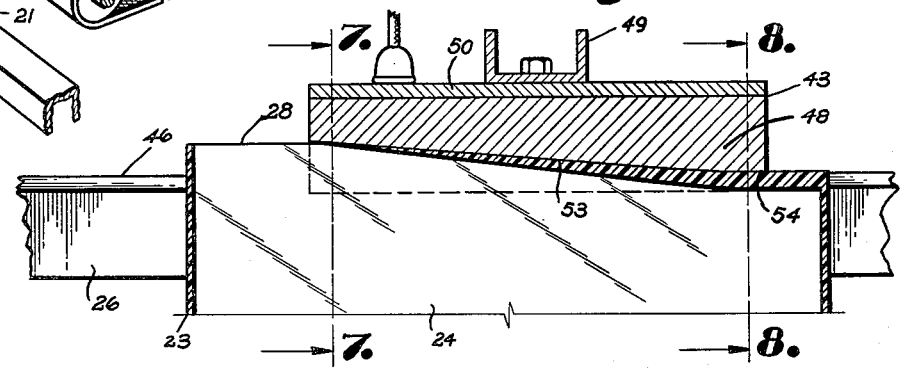
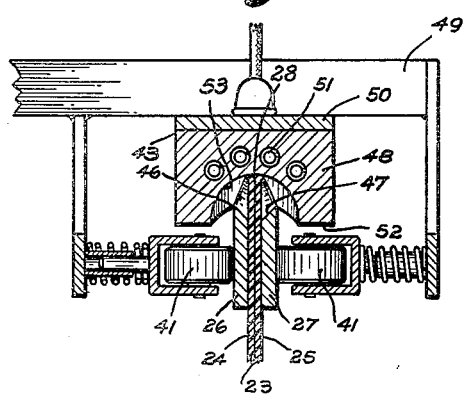
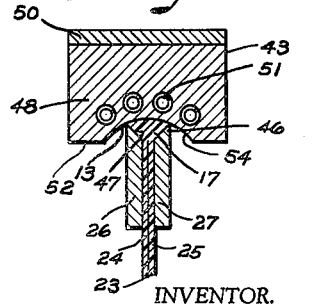
INVENTOR.
Howard S. Gable and
Glenn W. Kerr.
BY Fishburn and Gold
ATTORNEYS

United States Patent Office 2,994,361
Patented Aug. 1, 1961

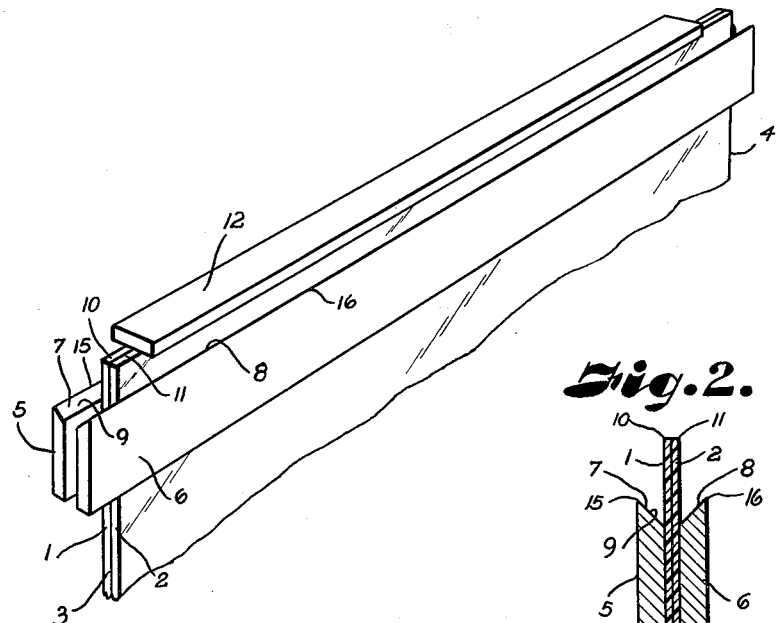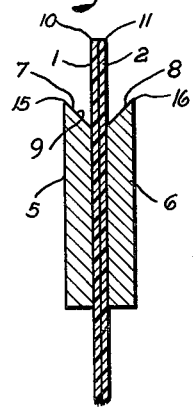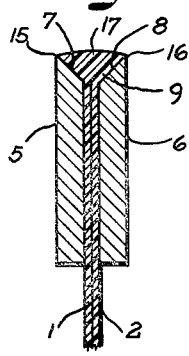
INVENTOR.
Howard S. Gable and
Glenn W. Kerr.
ATTORNEYS.

2,994,361
METHOD AND APPARATUS FOR SEALING THERMOPLASTIC MATERIAL
Howard S. Gable, Kansas City, Mo., and Glenn W. Kerr, Mission, Kans., assignors to Taf Research Corporation, Kansas City, Mo., a corporation of Missouri
Filed June 18, 1958, Ser. No. 742,817
7 Claims. (Cl. 154—42)

This invention relates to the method and apparatus for sealing thermoplastic material, and more particularly for heat sealing or seaming sheets of thermoplastic material in order to secure the edge of one sheet or layer to the edge of another sheet of like material. This invention relates more particularly to the joining of edges of sheets or laminae of thermoplastic films and is useful to form a web of the material into bag tubing and the like and for sealing or welding the edges of flattened tubes for making bags, envelopes or the like, and also for bonding or welding the edges of two sheets of the material together. The method and apparatus has been found particularly satisfactory for welding or sealing the edges of sheets of thermoplastic films such as polypropylene; however, the method and apparatus may also be used for welding sheets of polyethylene and other thermoplastic films such as Pliofilm, ethyl cellulose, cellulose acetate and co-polymers of vinyl chloride and vinyl acetate, and is particularly adapted for welding of edges of thin films having a thickness of from .0002 to .01 inch.

Polypropylene is a colorless, odorless thermoplastic material produced by stereospecific polymerization of propylene and may be of a molecular order or chain formation called isotactic or atactic, depending upon polymerization conditions. Typical properties of polypropylene are as follows:

| | |
|---|---|
| Specific gravity (68° F.) | 0.90–0.91. |
| Bulk factor | 2.25. |
| Tensile strength, 1000 p.s.i | 4.3–5.7. |
| Elongation (total), percent | 500–700. |
| Yield strength, 1000 p.s.i | 4.3–4.9. |
| Elongation (at yield), percent | 10–20. |
| Stiffness in flexure, 1000 p.s.i | 114–170. |
| Young's modulus, p.s.i | $4.4$–$4.8 \times 10^5$. |
| Impact strength, Izod, unnotched, cm.-kg./sq. cm | 80. |
| Hardness (Rockwell) | R85–95. |
| Melt index, gm./10 min | $6$–$20^d$. |
| Melting point, ° F | 329–338. |
| Softening point (Vicat), ° F.: | |
|     5-kg. load | 185. |
|     1-kg. load | 284. |
| Brittleness temperature, ° F | 14. |
| Specific heat, B.t.u./lb./° F | 0.46. |
| Coefficient of thermal conducitivity, B.t.u./hr./sq. ft./° F./in | 0.95. |
| Coefficient of thermal expansion, per ° F | $62 \times 10^{-6}$. |
| Dielectric strength (⅛ in.), v./mil | 769–820. |
| Dielectric constant ($10^6$ cps.) | 2.0–2.1. |
| Dissipation factor ($10^6$ cps.) | 0.0002–0.0003. |
| Volume resistivity, ohm-cm | $10^{16}$. |

Recently, there has been devised a process wherein polypropylene is made in a thin film having relatively low permeability to gases, vapors and liquids, and also has a relatively high degree of surface hardness, high elasticity and good abrasion resistance. The film is stressed or stretched to increase the mechanical properties. Polypropylene film has a sharp melting point, and in the stressed film, when subjected to temperatures near the melting point, the adjacent areas tend to shrink and wrinkle or otherwise become distorted, with the result that ordinary methods of heat sealing or welding have not been satisfactory.

The principal objects of the present invention are to provide a new and improved method of forming a seal or weld of the edge of one sheet or layer of thermoplastic such as polypropylene to the edge of another sheet or layer, leaving a gas, moisture and waterproof seam or bond that is stronger than the material itself; to provide containers such as envelopes, bags and the like formed of thermoplastic materials and having a new and improved rugged and strong end closure or seal; to provide apparatus which is adapted to form a smooth edge seam on sheets or layers of thermoplastic such as polypropylene; to provide apparatus of this class which is constructed as to avoid detrimental effects of thermal shrinkage or warpage of the material.

Other objects and advantages of this invention will become apparent from the following description taken in connection with the accompanying drawings wherein are set forth by way of illustration and example certain embodiments of this invention.

The objects of the invention are accomplished in general by securing sheets or layers of thermoplastic material such as polypropylene in flattened condition between a pair of strips or platens and tightly clamped thereby with marginal portions of both plies or sheets extending from the strips, the edges of the strips adjacent said marginal portions being bevelled to form a cavity extending longitudinally of said strips, and passing such extending portions of the plies or sheets through a heat zone while said sheets are clamped between the strips at such a speed that the extending marginal portions of the sheets passing through the heat zone will melt without combustion and without substantial carbonization to fuse the thermoplastic material whereby the molten material of both plies will coalesce into said cavity and the sides of the molten material will assume the shape of the cavity and become solidified, providing a stressing in the seal increasing the strength of the material therein. The strips are made of material that will conduct away and dissipate the heat at a relatively rapid rate and clamp the sheets whereby the effect of the heat is confined to the marginal portions of the sheets extending from the strips and the weld or seal formed in the cavity at the bevelled edges of said strips. The length of the extending portions is preferably such that the volume of the molten or coalesced material resulting therefrom is sufficient to form a uniform bead filling the cavity of the strips. The weld may be further worked to stress same by ironing or pressing the molten or fused material into the cavity by moving a heated shoe along the edges of the strips and compressing the molten material into the cavity.

FIG. 1 is a perspective view illustrating diagrammatically the manner of carrying out the process.

FIG. 2 is a transverse sectional view through the strips or platens with the sheets positioned therebetween.

FIG. 3 is a transverse sectional view through the strips or platens with the sheets therebetween with the edges melted into the cavities of said strips.

FIG. 4 is a transverse sectional view through the seal or bond at the edges of the sheets.

FIG. 5 is a perspective view of a sealing machine incorporating the principles of the invention.

FIG. 6 is a longitudinal sectional view through the heating member of the machine.

FIG. 7 is a transverse sectional view through the machine on the line 7—7, of FIG. 6.

FIG. 8 is a transverse sectional view through the sealing machine on the line 8—8, FIG. 6.

Referring more in detail to the drawings:

1 and 2 designate two superimposed sheets or plies of thin thermoplastic film of polypropylene or the like and in flattened state with edges 3 and 4 respectively parallel and preferably substantially in alignment with each other. The superimposed plies are positioned between a pair of opposed flat strips or platens 5 and 6 having edges 7 and 8 inclined or bevelled whereby said inclined edges cooperate to define a cavity 9 extending longitudinally of said strips or platens. The sheets or laminae 1 and 2 are so positioned whereby marginal portions 10 and 11 respectively adjacent the edges 3 and 4 extend from between the strips adjacent the bevelled or inclined edges and form the portion to be sealed. After the sheets 1 and 2 are positioned between the strips 5 and 6, said strips are moved toward each other to tightly and firmly clamp the sheets 1 and 2 therebetween along the portions to be sealed or joined. The length of the strips is preferably greater than the length of the edges of the sheets or films to be connected and sealed.

The strips are preferably cooled, and after the sheets have been positioned and clamped between the strips, the strips with the films are moved relative to a heat zone of a heat element 12 whereby the portions 10 and 11 extending from the cavity edges of the strips are exposed to the heat for a period of time sufficient to melt the extended portions back into the cavity 9 without combustion and the molten thermoplastic coalesces in a shape having sides conforming to the sides of the cavity 9. The strips 5 and 6 being cooled causes the portion of the molten material in contact with the inclined edges 7 and 8 thereof to set, and then as the strips with the films clamped therebetween are moved from the heat zone, the thermoplastic in the cavity sets, providing a stressing in the joint or bond. Excess material in the cavity is preferably removed by wiping a hot iron or shoe portion 13 (FIG. 8) longitudinally of the strips and in engagement with the outer edges 15 and 16 thereof which wiping action presses or molds the molten thermoplastic into the cavity 9 and further stresses the thermoplastic in the weld or joint increasing the physical properties thereof. The weld or joint 17 is then allowed to cool, and the strips 5 and 6 separated whereby the sheets are removed from therebetween, said sheets having been securely connected in the process by a substantially uniform seal or joint throughout the length thereof which seal or joint has a breaking strength greater than the films or sheets themselves. The sheets joined by such a seal or weld are free from wrinkles, warpage or distortion even in the portions adjacent the weld.

It is preferred that the edges 3 and 4 be in alignment, but the invention can be satisfactorily carried out if the sheets each have portions extending from the cavity edges of the strips to provide sufficient material for melting into and substantially filling the cavities formed by the bevelled edges 7 and 8 of said strips, and it is preferred that there not be sufficient portions of the sheets extending from between the strips at the cavity edges thereof whereby the molten material will be in such excess as to flow over the edges of said strips. The strips may be made of material having a high heat-conductivity, however, such strips may be made of any suitable material such as metal, for example, aluminum, steel, brass and the like.

While it is to be understood that our method may be carried out by any suitable mechanism, for high production sealing as, for example, of forming bags, the mechanism preferably includes a base 21 having a conveyor 22 supported thereon for conveying bags 23 and the like to be sealed. The conveyor 22 supports the bag 23 or other material or item to be sealed whereby opposite walls or plies 24 and 25 are flattened or brought together on each other. The opposed walls are engaged and carried through the sealing mechanism by a pair of cooperating endless strips or belts 26 and 27 having their inner runs in opposed relation and adapted to engage opposite sides respectively of the walls 24 and 25 in spaced relation to the upper edges 28 thereof. The belts 26 and 27 are engaged with and supported at the inlet end of the sealing mechanism by pulleys 29 and 30 which are rotatably mounted on stub shafts 31 and 32 respectively carried by a bracket member 33 that is supported by the base 21. At the outlet ends of the sealing mechanism, the belts 26 and 27 are engaged with and supported on pulleys 34 and 35 fixed on shafts 36 and 37 respectively carried by a bracket 38. The pulleys 29 and 30 are simultaneously driven by gearing 39 which is driven by a motor 40. A plurality of idler pulleys 41 are arranged in back-up relation to the opposed inner runs of the belts 26 and 27 to hold the same in gripping relation to the walls 24 and 25. It is preferable that the inner runs of the belts be of sufficient length for a cooling station 42, a sealing station 43 and a cooling station 42' to be arranged in that order between the inlet and outlet ends thereof. At the cooling stations 42 and 42', the belts or bands 26 and 27 are engaged by cooling members 44. Hose connections 45 are preferably provided at opposite ends of the cooling members 44 to supply the same with a cooling fluid. Other means of maintaining the cooling members at desired cooling temperatures or otherwise cooling the belts or bands 26 and 27 prior to the entry into the sealing zone may be employed.

The upper edges 46 of the belts 26 and 27 respectively are bevelled inwardly and downwardly to cooperate to form a V-shaped groove or cavity 47, the sides of which are preferably arranged to provide a substantially 90 degrees of included angle. At the sealing station 43, a heating member 48 is supported above the belts 26 and 27 by means of a bracket 49 supported on the base 21. An insulating block 50 is preferably interposed between the heating block or member 48 and the bracket and suitable heating means 51 is connected with the heating member 52 to heat same to a suitable temperature for melting and/or fusing the upper ends of the walls 24 and 25 together to form a seal therebetween. In the illustrated structure, the heating means or element 51 is arranged in the member 48 and is connected with a current supply with suitable temperature control devices whereby the temperature will be maintained in the heating member to heat the edges of the walls 24 and 25 extending upwardly from the trough or cavity 47 formed by the bevelled edges 46 of the belts 26 and 27 to fuse or melt said upwardly extending portions of the walls and form same in the cavity 47 formed by the upper edges of the belts. The heating element preferably has a bottom surface 52 having an upwardly concave channel or groove 53 therein into which the upper edges of the walls 24 and 25 extend. The height of the groove 53 decreases along the length of the heating member 48 to a preferable slight concavity at the outlet end 54 thereof whereby the sides of the groove adjacent said outlet end 54 engage the belts 26 and 27 at the sides of the cavity 47, and the heating member thereby forms a shoe wiping the fused or molten material downwardly into the cavity 47 formed by the upper bevelled edges of the belts. The upper edges of the walls 24 and 25 are subjected to the heat of the heating member 48 as they pass thereunder, and said walls travel at a speed which permits said edges to be fused or melted by the heat of said heating member; however, the portion of the walls contacted by the belts 26 and 27 and tightly gripped therebetween maintains the portions of the walls therebetween and below in a compressed relatively cool condition whereby no melting, shrinkage or warping of the portions of the walls between the belts will occur, and the melting or fusing of the walls is limited to the portion in the cavity 47 and above. As the melted portion in the cavity moves beyond the heating member 48, said melted portion cools and sets forming a bond between the walls. It is preferable for production purposes to quickly cool the bond or weld; therefore, the belts 26 and 27 and the portion of the material in the cavity 47 are subjected to the cooling element 44 at the cooling station 42' supported on a bracket 55 and having hose connections 56 preferably provided at opposite ends thereof to supply the cooling element with a cooling fluid. Other means of cooling the belts in the cooling station 42' may be employed.

The sealed walls are released from the machine at the outlet end of the belts 26 and 27 as they pass around the pulleys 34 and 35 and move to a discharge point by the conveyor 22 which is driven to move at the same speed as the belts 26 and 27. The sealed edges of the walls 24 and 25 have a seal or bond substantially as shown in FIG. 3 as the shoe portion of the heating member 48 trims the edges of any excess material and assures that the molten material is forced down into the cavity 47. This works and molds the molten material to the desired shape. It is to be understood the shoe portion for working and pressing the thermoplastic into the cavity may be a separate heated member adjacent the outlet end of the heating member 48. The heat of the heating member 48 should be sufficient to obtain a molten condition of the portions of the walls extending upwardly from the cavity 47 and may vary with the speed of the belts 26 and 27. In the structure illustrated, the thickness of the belts 26 and 27 is preferably approximately 1/16 of an inch, and it is preferable that the portion of the walls extending from the cavity 47 as they pass into the groove in the heating member be sufficient whereby when melted the material will substantially fill the cavity 47. This provides sufficient material at the seal whereby it is stronger than the film itself.

It has been found that by cooling of the belts 26 and 27 any tendency of the molten or melted polypropylene to adhere to the bevelled edges 46 is eliminated. Also, it is preferable that the heating member be of a temperature above the melting point of the polypropylene, and it is found that any material tending to adhere thereto will vaporize providing a self-cleaning action. While the mechanism is particularly adapted for sealing of bags and walls and the like formed of polypropylene film material, it may be used for sealing of bags or joining of walls of any other material having similar melting and seam-forming characteristics. The upper edges of the sealed walls are provided with a seam that is integral with the walls and which is of substantially uniform cross section and strength for the full length of the seam. In the illustrated forms of the machine, the walls of the work being sealed are moved with the edges of the material to be sealed uppermost, but it is to be understood that the mechanism may be otherwise arranged relative to the work. As the heating element is shaped and related to the cavity of the belts, the molten material is formed into the cavity whereby the sealing mechanism may be positioned so that the work is carried on one side.

It is to be understood that various changes and modifications may be made in the above-described invention, and it is not to be limited to the specific forms or arrangements of parts herein described and shown except insofar as such limitations are included in the claims.

What we claim and desire to secure by Letters Patent is:

1. The method of joining together marginal portions of sheets of thermoplastic film which comprises, placing sheets of the film in face to face relation between clamping members having mating edge portions defining continuous contiguous flat clamping areas and diverging portions defining an open longitudinal cavity with said marginal portions extending from said open cavity and having outer free edges spaced a predetermined distance therefrom, moving the clamping members into clamping engagment with the sheets of film therebetween, cooling said clamping areas and said diverging portions whereby said cavity defining portions are cooled, applying heat to the extending marginal portions of said films to melt same back into said open cavity, conducting excess heat away from the clamping members to restrict the melting to the free marginal portions in and extending from said open cavity whereby the sheets clamped between said clamping members are protected against distortion due to the heat and the sides of said melted material in said cavity is cooled and solidified, discontinuing the application of heat to said thermoplastic material in said cavity, and continuing the cooling of said melted thermoplastic material whereby it solidifies to form a joint for the films substantially of the shape of said cavity.

2. The method of joining together marginal portions of sheets of film of thermoplastic material which comprises, placing marginal portions of sheets of the film in face to face relation between clamping members having mating edge portions defining continuous contiguous flat clamping areas and diverging portions defining an open longitudinal cavity with outer free edges of said marginal portions extending from said open cavity and spaced a predetermined distance therefrom, moving the clamping members into clamping engagement with said marginal portions of the sheets of film therebetween, cooling said clamping areas and said diverging portions whereby said cavity defining portions are cooled, applying heat to the extending marginal portions of said films to melt same back into said open cooled cavity, conducting excess heat away from the clamping members to restrict the melting to the free marginal portions in and extending from said open cavity whereby the sheets clamped between said clamping members are protected against distortion from the heat and the sides of said melted material in said cavity is cooled and solidified, pressing the molten thermoplastic material of the extending marginal portions through said cavity opening into said cavity, discontinuing the application of heat to said thermoplastic material in said cavity, continuing the cooling of said melted thermoplastic material whereby it sets to form a joint for the films substantially of the shape of said cavity, and then moving the clamping members to release the joined sheets from clamped engagement therebetween.

3. The method of joining together marginal portions of sheets of polypropylene film which comprises, placing marginal portions of sheets of the film in face to face relation between clamping members having mating edge portions defining continuous contiguous flat clamping areas and diverging portions defining an open longitudinal cavity with outer free edges of said marginal portions extending from said open cavity and spaced a predetermined distance therefrom, moving the clamping members into clamping engagement with said marginal portions of the sheets of film therebetween, cooling said clamping areas and said diverging portions whereby said cavity defining portions are cooled, progressively effecting relative movement of a heating member toward the cavity opening, applying heat from said heating member sufficient to melt the extending marginal portions of said films adjacent thereto back into said open cooled cavity, conducting excess heat away from the clamping members to restrict the melting to the free marginal portions in and extending from said open cavity whereby the sheets clamped between said clamping members are protected against distortion from the heat and the sides of said melted material in said cavity is cooled and solidified, moving a molding member toward the cavity to press said molten polypropylene of the extending marginal portions through said cavity opening and into said cavity for molding said polypropylene into a substantially triangular cross section with adjacent sides diverging from opposite faces of said sheets, bringing about a relative movement of the clamping members and molding member longitudinally of the cavity, discontinuing the application of heat to said polypropylene in said cavity, continuing the cooling of said melted polypropylene whereby it sets to form a longitudinally stressed joint for the films substantially of the shape of said cavity, and then releasing the joined films from said clamping members.

4. Apparatus for joining together the marginal portions of laminae of polypropylene comprising, means for conveying laminae of polypropylene along a predetermined path, means to bring marginal portions of said laminae into flat face-to-face engagement with free edges substantially aligned, cooling belts having opposed runs for engaging said laminae on opposite sides and in vertically spaced relation to the free edges of said marginal portions as said laminae is carried along a portion of its path, means cooling said belts, said belts having bevelled edges along the length thereof forming a substantially V-shaped cavity from which said marginal portions extend, said V-shaped cavity being open at said belt edges, means applying pressure to said belts to tightly clamp said laminae therebetween adjacent said V-shaped cavity apex during a portion of the path of movement thereof, heating means adjacent the belt edges forming said cavity along the portion of the path wherein said laminae are clamped by said belts for heating said extending marginal portions and melting same, and pressing means at said cavity opening at a portion of the path of movement wherein said laminae are clamped by the belts for pressing said melted material into the cavity for shaping the molten polypropylene into a joint formation corresponding to the shape of said cavity.

5. Apparatus for joining together marginal portions of laminae of thermoplastic material comprising, means for conveying laminae of fusible thermoplastic material along a predetermined path, elongate platens for engaging said laminae on opposite sides with marginal portions of said laminae in flat face-to-face engagement and free edges thereof substantially aligned and in spaced relation to said platens, said elongate platens being moved with said conveying means as said laminae is carried along a portion of its path, means cooling said platens, said platens having bevelled edges along the length thereof forming a substantially V-shaped cavity from which said marginal portions extend, said V-shaped cavity being open at said platen edges, means applying pressure to said platens to tightly clamp said laminae therebetween adjacent said V-shaped cavity apex during a portion of the path of movement thereof, heating means adjacent the platen edges forming said cavity along a portion of the path wherein said laminae are clamped by said platens for heating said extending marginal portions to approximately the melting point of said thermoplastic material, and pressing means at said cavity opening at a portion of the path of movement wherein said laminae are clamped by the platens for pressing said melted material into the cavity for shaping the molten thermoplastic material into a joint formation corresponding to the shape of said cavity.

6. Apparatus for joining together marginal portions of laminae of thermoplastic material comprising, means for conveying laminae of fusible thermoplastic material along a predetermined path, belts having opposed runs for engaging said laminae on opposite sides with marginal portions of said laminae in flat face-to-face engagement and free edges thereof substantially aligned and in spaced relation to said belts as said laminae is carried along a portion of its path, said belts having bevelled edges along the length thereof forming a substantially V-shaped cavity from which said marginal portions extend, said V-shaped cavity being open at said belt edges, means applying pressure to said belts to tightly clamp said laminae therebetween adjacent said V-shaped cavity apex during a portion of the path of movement thereof, heating means adjacent the belt edges forming said cavity along a portion of the path wherein said laminae are clamped by said belts for heating only said extending marginal portions to approximately the melting point of said thermoplastic material, means cooling said belts to maintain said belts and the bevelled edges thereof cooled in the portion of the path of movement wherein the laminae are clamped therebetween, and means at said cavity opening at a portion of the path of movement wherein said laminae are clamped by the belts for pressing said melted material into the cavity for shaping the molten thermoplastic material into a joint formation corresponding to the shape of said cavity.

7. Apparatus for joining together marginal portions of laminae of thermoplastic material comprising, means for conveying laminae of fusible thermoplastic material along a path means to bring marginal portions of said thermoplastic material into flat face-to-face engagement with free edges substantially aligned, belts having opposed runs for engaging said laminae on opposite sides and in spaced relation to the free edges of said marginal portions as said laminae is carried along a portion of its path, said belts having bevelled edges along the length thereof forming a substantially V-shaped cavity from which said marginal portions extend, said V-shaped cavity being open at said belt edges, means applying pressure to said belts to tightly clamp said laminae therebetween adjacent said V-shaped cavity apex during a portion of the path of movement thereof, heating means adjacent the belt edges forming said cavity along a portion of the path wherein said laminae are clamped by said belts for heating said extending marginal portions to approximately the melting point of said thermoplastic material, means cooling said belts to maintain said belts and the bevelled edges thereof cooled in the portion of the path of movement wherein the laminae are clamped therebetween, and means at said cavity opening at a portion of the path of movement wherein said laminae are clamped by the belts and said marginal portions at approximately the melting point of said thermoplastic material for pressing said melted material into the cavity as said laminae are moved thereby for shaping the molten thermoplastic material into a joint formation substantially corresponding to the shape of the cavity.

References Cited in the file of this patent

UNITED STATES PATENTS

| | | |
|---|---|---|
| 2,141,241 | Fechheimer | Dec. 27, 1938 |
| 2,162,464 | Soderberg | June 13, 1939 |
| 2,407,495 | High | Sept. 10, 1946 |
| 2,666,600 | Huch | Jan. 19, 1954 |
| 2,678,679 | Bergstein | May 18, 1954 |
| 2,679,469 | Bedford | May 25, 1954 |
| 2,691,474 | Olson | Oct. 12, 1954 |
| 2,762,421 | Quinche | Sept. 11, 1956 |